US008251322B2

(12) United States Patent
Vincent (10) Patent No.: US 8,251,322 B2
(45) Date of Patent: Aug. 28, 2012

(54) CATHODE RAY TUBE MONITOR TO FLAT PANEL MONITOR CONVERSION BRACKET

(75) Inventor: Troy Vincent, Taylorsville, KY (US)

(73) Assignee: United Parcel Service of America, Inc.

( * ) Notice: Subject to any disclaimer, the term of this patent is extended or adjusted under 35 U.S.C. 154(b) by 937 days.

(21) Appl. No.: 12/172,383

(22) Filed: Jul. 14, 2008

(65) Prior Publication Data

US 2010/0006726 A1    Jan. 14, 2010

(51) Int. Cl.
*A47G 29/00*    (2006.01)
(52) U.S. Cl. ... 248/126; 248/200; 248/917; 361/679.21; 348/825
(58) Field of Classification Search ............. 248/220.21, 248/205.1, 223.31, 300, 200, 917, 919, 924, 248/216.1, 309.1, 176.1, 200.1, 644, 126, 248/146; 361/679.21; 348/844, 825, 838
See application file for complete search history.

(56) References Cited

U.S. PATENT DOCUMENTS

| | | | | |
|---|---|---|---|---|
| 2,299,674 A * | 10/1942 | Austin, Jr | .................. | 248/311.2 |
| 3,182,805 A * | 5/1965 | Foster, Jr. et al. | ............... | 211/26 |
| 3,327,310 A * | 6/1967 | Bethune et al. | ............... | 343/702 |
| D271,849 S * | 12/1983 | Kunz | ............................. | D8/384 |
| 4,603,789 A * | 8/1986 | Medlin, Sr. | .................... | 220/3.9 |
| 4,832,297 A * | 5/1989 | Carpenter | .................. | 248/205.1 |
| 4,836,478 A | 6/1989 | Sweere | | |
| 4,964,525 A * | 10/1990 | Coffey et al. | .................. | 220/3.9 |
| 4,984,762 A * | 1/1991 | Braun et al. | ............... | 248/216.1 |
| 5,098,046 A * | 3/1992 | Webb | ........................... | 248/27.1 |
| 5,174,539 A * | 12/1992 | Leonard | ........................ | 248/558 |
| 5,288,041 A * | 2/1994 | Webb | ............................ | 248/27.1 |
| 5,322,255 A | 6/1994 | Garrett | | |
| 5,546,716 A * | 8/1996 | Broxterman et al. | ........ | 52/220.1 |
| 6,158,706 A * | 12/2000 | Johnson | ..................... | 248/354.3 |
| D472,793 S * | 4/2003 | Callahan et al. | ............. | D8/349 |
| 6,585,203 B1 * | 7/2003 | Euker | ........................ | 248/200.1 |
| 6,708,940 B2 | 3/2004 | Ligertwood | | |
| 6,766,992 B1 * | 7/2004 | Parker | ........................... | 248/300 |
| 6,803,521 B2 * | 10/2004 | Vrame | ............................. | 174/58 |
| 6,807,780 B2 * | 10/2004 | McCahill et al. | ............ | 52/220.8 |
| 7,097,082 B2 * | 8/2006 | Wallaker | ....................... | 224/483 |
| 7,111,814 B1 * | 9/2006 | Newman | .................... | 248/274.1 |
| 7,398,949 B2 * | 7/2008 | Weech et al. | ............. | 248/220.21 |
| 7,611,118 B2 * | 11/2009 | O'Neill | ............................ | 248/551 |
| 7,866,622 B2 * | 1/2011 | Dittmer | ......................... | 248/421 |
| 2001/0042812 A1 * | 11/2001 | Perzewski | .................... | 248/27.1 |
| 2005/0067541 A1 * | 3/2005 | Dinh et al. | .................... | 248/200 |
| 2006/0006296 A1 * | 1/2006 | Morita | ........................... | 248/200 |

FOREIGN PATENT DOCUMENTS

| | | | |
|---|---|---|---|
| JP | 04313627 A | * | 11/1992 |
| JP | 06221069 A | * | 8/1994 |

OTHER PUBLICATIONS

Ergotron® CRT Monitor Arm Mounting Solutions; Ergonomic solutions for any area of your facility; pp. 1-28; 2004.

* cited by examiner

*Primary Examiner* — Kimberly Wood
(74) *Attorney, Agent, or Firm* — Alston & Bird LLP (57) ABSTRACT

A conversion bracket is described. Specifically, the conversion bracket allows a mounting system for use with a computer system having a CRT monitor to be used with a computer system having a flat panel monitor. The conversion bracket may comprise a two prong mounting adapter and a flange to secure the conversion bracket to the CRT monitor caddy.

13 Claims, 6 Drawing Sheets

CATHODE RAY TUBE MONITOR TO FLAT PANEL MONITOR CONVERSION BRACKET

FIELD OF THE INVENTION

Various embodiments of the present invention generally relates to a mounting bracket. More particularly, particular embodiments of the present invention relate to a conversion bracket that allows a Cathode Ray Tube monitor caddy to be compatible for use with flat panel monitors.

BACKGROUND OF THE INVENTION

Computer systems typically include at least a monitor, a keyboard, a central processing unit (CPU), a chipset, and memory. Depending on the configuration of the computer system, the monitor may be attached to the rest of the computer system by only a Video Graphics Array cable, Digital Video Interface cable, or similar connection device. Examples of common monitor types include Cathode Ray Tube (CRT) and Liquid Crystal Display (LCD) monitors. LCD monitors are often referred to as "flat panel monitors."

Flat panel monitors are becoming increasingly popular with consumers. They typically offer better image quality, have a smaller footprint, and consume less electricity than Cathode Ray Tube (CRT) monitors. Flat panel monitors are now outselling their CRT counterparts by a wide margin. As consumers transition from CRT monitors to flat panel monitors, mounting solutions that were used with computer systems having CRT monitors are becoming obsolete. Mounting solutions are typically used to mount computer systems for user access in laboratories, factory floors, offices, and other work areas.

Mounting solutions for computer systems having CRT monitors were not originally designed to support flat panel monitors. Thus, if a consumer desires to upgrade her old CRT monitor to a new flat panel monitor, she will also have to invest in a mounting solution that is compatible with flat panel monitors. Accordingly, a need exists in the art for flat panel mounting solution which can utilize existing CRT mounting solutions.

SUMMARY OF THE INVENTION

A conversion bracket is provided for allowing a mounting solution intended for a Cathode Ray Tube monitor to be used with a computer system having a flat panel monitor. In an embodiment, the conversion bracket comprises a two prong mounting adaptor, a first base portion coupled to the mounting adaptor, a monitor mounting plate coupled to the first base portion, a second base portion coupled to the mounting plate, and a flange coupled to the second base portion. The flange is at least substantially perpendicular (e.g., perpendicular) to the first base portion, the mounting plate, and the second base portion.

In another embodiment, a conversion bracket comprises a base portion, a two prong mounting adaptor, a monitor mounting plate, and a flange. The two prong mounting adaptor is coupled to a first end of the base portion. The flange is coupled to the second end of the base portion. The monitor mounting plate is positioned intermediate to the first end and the second end of the base portion.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

Figure 1:
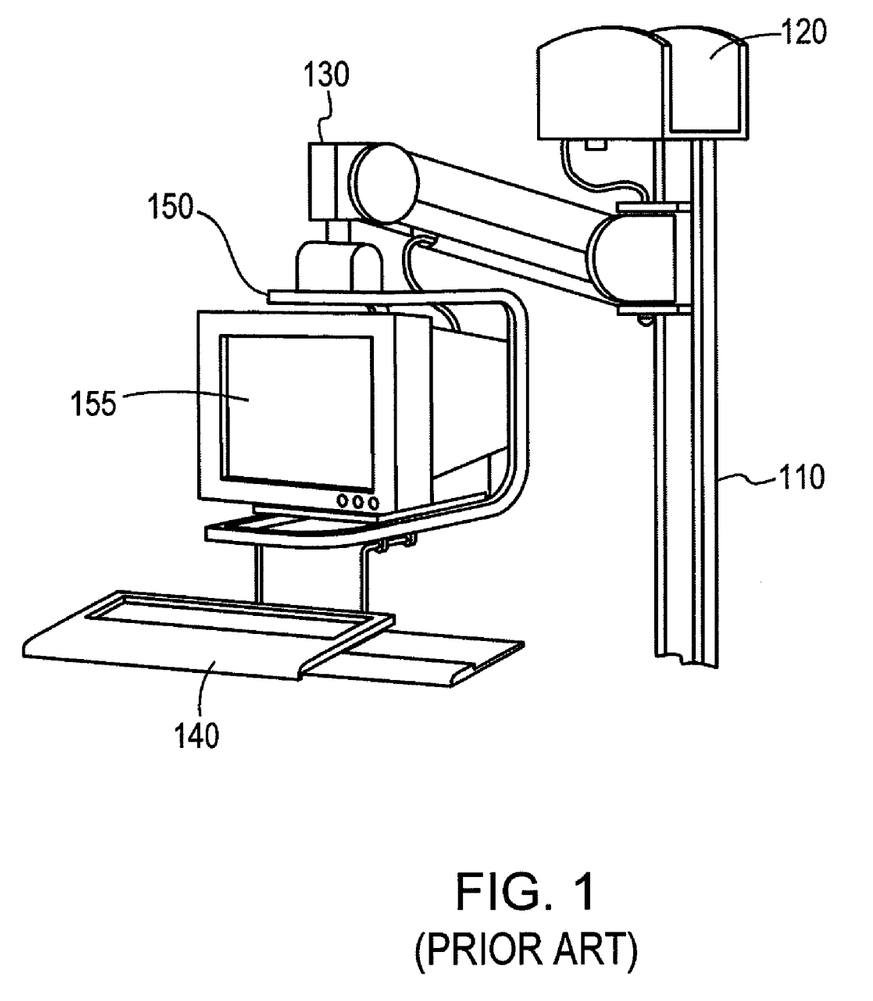
FIG. 1 is a perspective view of a prior art mounting solution for a computer system having a CRT monitor.

FIG. 1 depicts a prior art implementation of a mounting solution for a computer system having a CRT monitor. This particular mounting solution is manufactured by Ergotron, Inc. The mounting solution comprises a post 110, a CPU holder 120, a suspension arm 130, a keyboard holder 140, and a monitor caddy 150. The CPU holder 120 and suspension arm 130 are coupled to the command post 110. The monitor caddy 150 is coupled to the suspension arm 130. The keyboard holder 140 is coupled to the monitor caddy 150. The monitor caddy 150 is designed to hold a CRT monitor 155. Similarly, the CPU holder 120 is deigned to hold a CPU tower and the keyboard holder 140 is designed to hold a keyboard.

Figure 2:
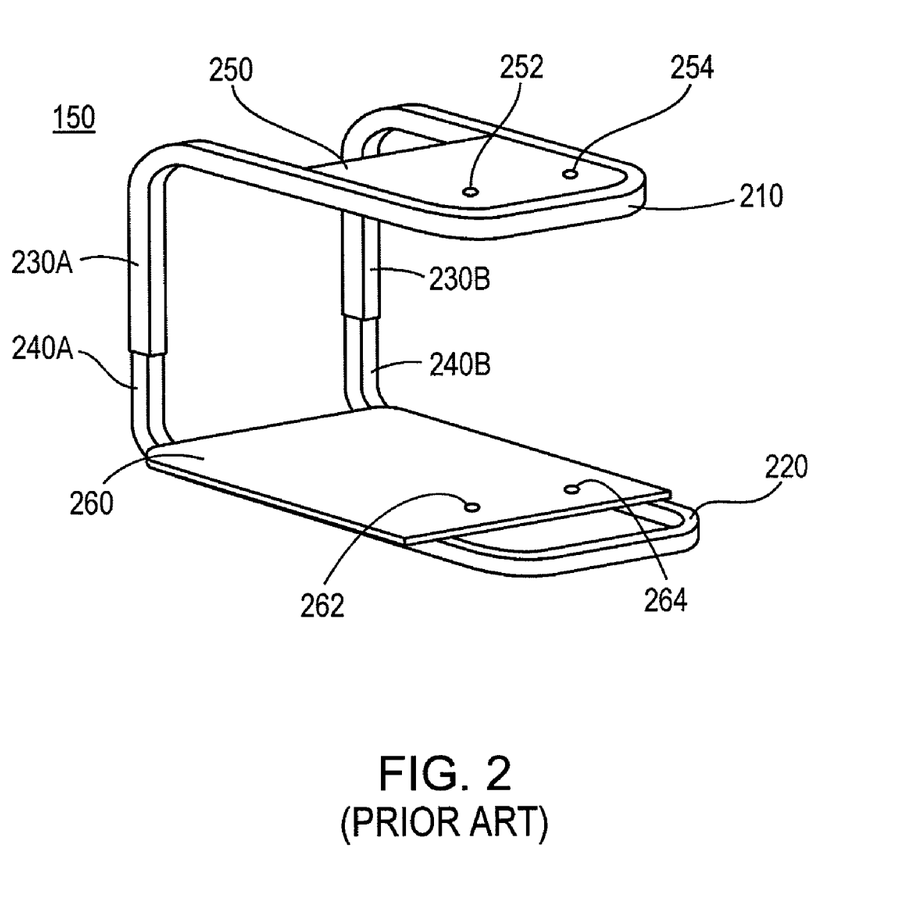
FIG. 2 is a perspective view of a prior art monitor caddy.

FIG. 2 depicts a prior art implementation of a monitor caddy 150. Monitor caddy 150 comprises a frame having an upper brace and a lower brace. The upper brace includes u-shaped horizontal portion 210 and two downward directed leg portions 230A, 230B. The upper brace is coupled to an upper horizontal plate member 250. The lower brace includes u-shaped horizontal portion 220 and two upward directed leg portions 240A, 240B. The lower brace is coupled to a lower horizontal plate member 260. The leg portions 230A, 230B are configured to accept the leg portions 240A, 240B respectively such that the u-shaped horizontal portion 210 of the upper brace is positioned substantially parallel and co-facing with the u-shaped horizontal portion 220 of the lower brace.

The upper horizontal plate member 250 is configured to couple the monitor caddy 150 to the suspension arm 130. The lower horizontal plate member 260 is configured to couple the monitor caddy 150 to the CRT monitor 155. The upper horizontal plate member 250 is substantially parallel to the lower horizontal plate member 260. Leg portions 230A, 230B and leg portions 240A, 240B may be extended or retracted in a telescoping manner to adjust the distance between the upper horizontal plate member 250 and the lower horizontal plate member 260. For example, the distance between the upper horizontal plate member 250 and the lower horizontal plate member 260 of the monitor caddy may be adjusted between approximately 12 and 22 inches.

The upper horizontal plate member 250 and the lower horizontal plate member 260 may define at least two through holes each. The at least two through holes 252, 254 of the upper horizontal plate member 250 are less than two inches from the front of the upper brace 210 and are spaced approximately one inch from center to center. The at least two through holes 262, 264 of the lower horizontal plate member 260 are between approximately 12 and 15 inches from the front of the lower brace 220 and are spaced approximately four inches center to center.

Various embodiments of the invention provide conversion brackets that adapt an adjustable CRT monitor caddy for use with a flat panel monitor. The adjustable monitor CRT caddy may be, for example, Ergotron model number 40-002-000, 40-004,000, 40-008-000, 40-013-000, or 40-043-000. In particular embodiments, the conversion bracket engages the upper horizontal plate member 250 and the lower horizontal plate member 260 and provides a mounting surface for flat panel monitors.

Figure 3:
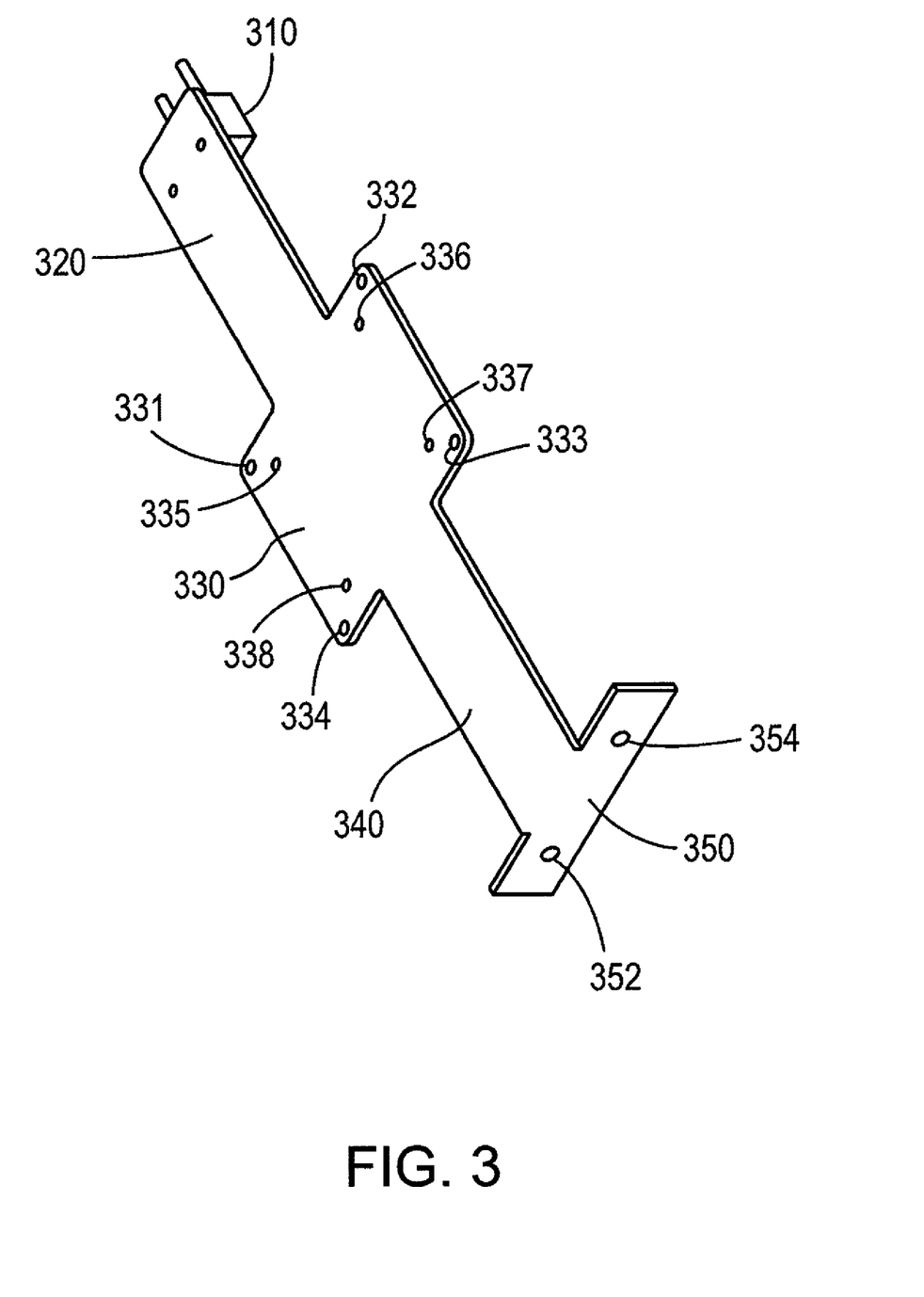
FIG. 3 is a perspective view of a conversion bracket.

An embodiment of a conversion bracket is depicted in FIG. 3. In this embodiment, the conversion bracket comprises a mounting adaptor 310, a first base portion 320, a monitor mounting plate 330, a second base portion 340, and a flange 350. The mounting adaptor 310 is coupled to the first base portion 320. The first base portion 320 is coupled to the monitor mounting plate 330. The monitor mounting plate 330 is coupled to the second base portion 340. The second base portion 340 is coupled to the flange 350.

The first base portion 320, the monitor mounting plate 330, and the second base portion 340 may be manufactured as one continuous assembly in a molding process for metals or plastics. The first base portion 320, the monitor mounting plate 330, the second base portion 340, and the flange 350 may comprise a metal alloy or a high strength plastic, and have a thickness between approximately 1/32 and 1/8 inch. The flange 350 may be substantially perpendicular to the first base portion 320, the mounting plate 330, and the second base portion 340. The intersection of the flange 350 and the second base portion 340 may have a bend radius of approximately 1/8 inch.

The mounting adaptor 310 may be coupled to the first base portion 320 by a weld, rivets, or screws. The mounting adaptor 310 may comprise a metal alloy or a high strength plastic. The mounting adaptor 310 may be a male connector having a mounting block which supports a first prong and a second prong. In particular embodiments, the first and second prongs are spaced apart and substantially parallel. In use, the spacing and size of the prongs are designed to extend through holes defined in the upper horizontal plate member 250. In various embodiments, the length of each prong may be approximately one inch, and the diameter of each prong may be approximately 1/8 inch. The two prongs may be spaced approximately one inch from one another.

In various embodiments, the first base portion 320 is a substantially flat elongate structure having a first end and a second end. The mounting adaptor 310 is secured proximate the first end. In various other embodiments, the first end of the first base portion 320 may be formed into two prongs in place of a separate mounting adapter. The first base portion 320 may have a length from one to 16.5 inches, and a width of at least one inch.

In particular embodiments, the monitor mounting plate 330 is a substantially flat square or rectangular structure having a first end and a second end. The monitor mounting plate 330 may have a length between approximately 4.5 and 20 inches, and a width of at least 4.5 inches. The first end of the mounting plate 330 is secured to the second end of the first base portion 320. The mounting plate 330 may define a plurality of through holes.

The second base plate 340 is a substantially elongate structure having a first end and a second end. The second base portion 340 may have a length between approximately one and 16.5 inches, and a width of at least one inch. The first end of the second base plate 340 is secured to the second end of the mounting plate 330. For one embodiment of the invention, the widths of the first base portion 320 and the second base portion 340 may be between approximately one and two inches, and the width of the monitor mounting plate 330 may be between approximately 4.5 and six inches. In another embodiment of the invention, the widths of the first base portion 320, the monitor mounting plate 330, and second base portion 340 may be approximately 4.5 inches.

The flange 350 may be coupled to the second end of the second base plate 340. The flange 350 may have a length greater than approximately 1.5 inches, and a width greater than approximately 4.875 inches. The flange 350 may be welded to the second base portion 340. Alternatively, the flange 350 may be formed with first base portion 320, monitor mounting plate 330, and second base portion 340 as one continuous assembly. The bend radius between the flange 350 and second base portion 340 may be formed using a bending tool. In a particular embodiment, the flange 350 defines a first through hole 352 and a second through hole 354. The through holes 352, 354 may be approximately 1/4 inch in diameter. The through holes 352, 354 are approximately 3/4 inch from the second base portion 340 intersection and spaced approximately four inches apart center to center.

In various embodiments, the first prong and second prong of the mounting adaptor 310 may be inserted into through holes 252, 254 of a monitor caddy's upper horizontal plate member 250. In various embodiments, the flange 350 is positioned above the caddy's lower horizontal plate member 260 such that the through holes 352, 354 of the flange 350 are aligned with the two through holes 262, 264 of the lower horizontal plate member 260. A first bolt may be inserted through through holes 352 and 262, and a second bolt may be inserted through through holes 354 and 264 to secure the conversion bracket to the monitor caddy.

The overall length of the conversion bracket is measured from the tip of the first base portion 320 to the bottom of the flange 350. The legs of the monitor caddy may be adjusted such that the distance between the upper horizontal plate member 250 and the lower horizontal plate member 260 is approximately equal to the overall length of the conversion bracket. When properly secured, the base portions of the conversion bracket may be perpendicular to the upper horizontal plate member 250 and the lower horizontal plate member 260.

The monitor mounting plate 330 may define a first set of four through holes 331, 332, 333, 334. The through holes are positioned to form a first square pattern such that each through hole is at a corner of the first square. Each through hole is spaced approximately 4.5 inches from the two nearest through holes. The through holes 331, 332, 333, 334 enable 100 millimeter screws to pass through the monitor mounting plate 330 to secure a flat panel monitor to the conversion bracket.

Furthermore, the monitor mounting plate 330 may define a second set of four through holes 335, 336, 337, 338. The through holes are positioned to form a second square pattern such that each through hole is adjacent (e.g., at) a corner of the second square. The second square pattern is positioned to be inside the first square pattern on the monitor mounting plate 330. Each through hole is spaced approximately three inches from the two nearest through holes in the set of four. The through holes 335, 336, 337, 338 enable 75 millimeter screws to pass through the monitor mounting plate 330 to secure a flat panel monitor to the conversion bracket. A flat panel monitor having a screen greater than six inches as measured diagonally may be attached to the mounting plate 330 via the first set of four through holes 331, 332, 333, 334 or the second set of four through holes 335, 336, 337, 338.

Figure 4:
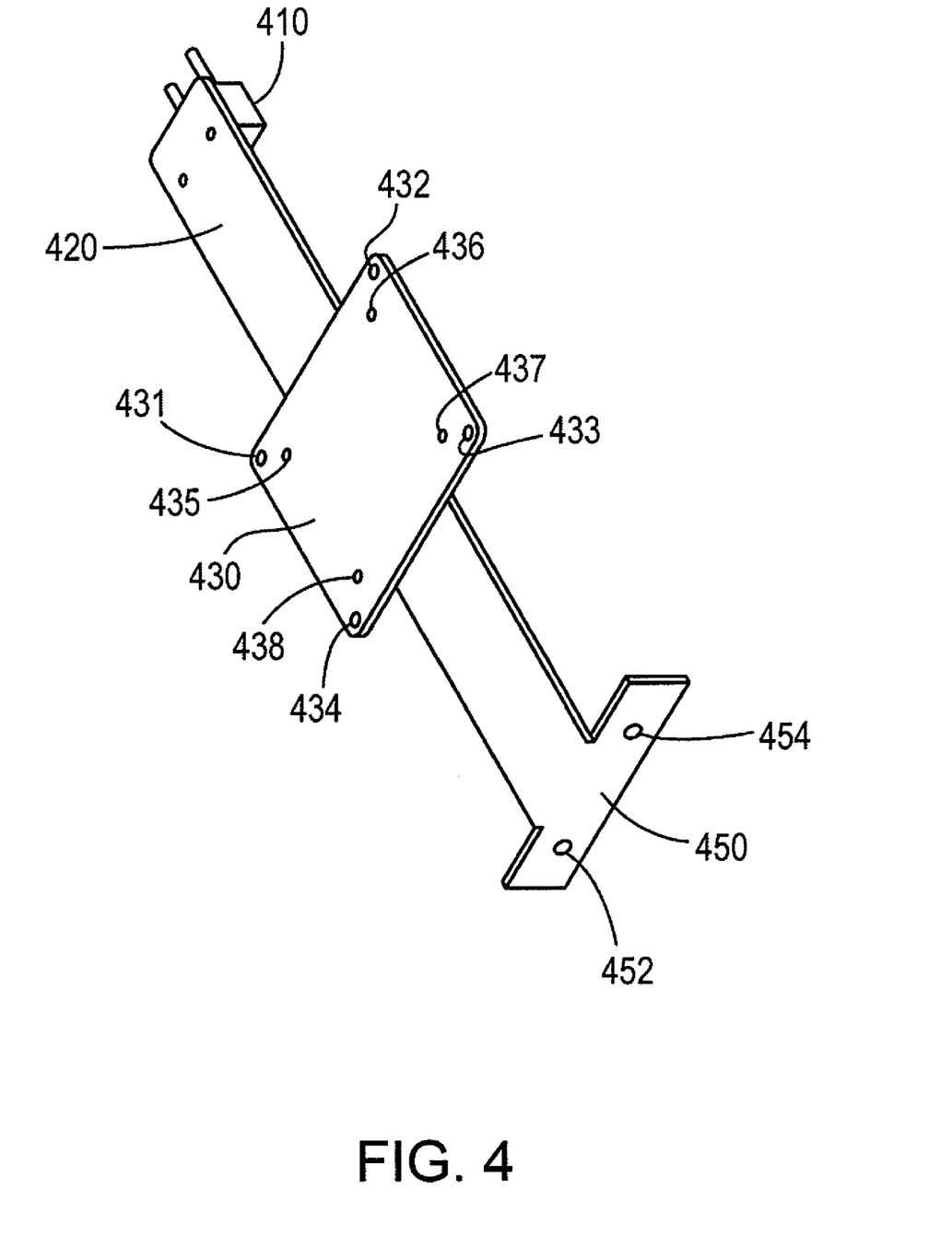
FIG. 4 is a perspective view of an additional conversion bracket.

FIG. 4 depicts another embodiment of the invention. This conversion bracket comprises a mounting adaptor 410, a base portion 420, a monitor mounting plate 430, and a flange 450. The flange 450 defines two through holes 452, 454. The mounting adaptor 410 comprises a first prong and a second prong. The first and second prongs are spaced approximately one inch apart and are each approximately one inch in length. The mounting adaptor 410, the monitor mounting plate 430, and the flange 450 are coupled to the base portion 420. The mounting adaptor 410, the monitor mounting plate 430, the flange 450, and the base portion 420 may comprise a metal alloy. For this embodiment of the invention, the base portion 420 is between approximately 12 and 22 inches in length, and between approximately 1/32 and 1/8 inch in thickness. The monitor mounting plate 430 and the mounting adaptor 410 may be welded to the base portion 420. The flange 450 may be welded to the base portion 420 or formed with the base portion 420 as a single assembly. The flange 450 is perpendicular with the base portion 420.

The mounting plate may define four 100 millimeter screw through holes and four 75 millimeter screw through holes. The four 100 millimeter screw through holes are positioned in a square pattern such that each through hole is approximately 4.5 inches from the two nearest through holes in the set of four. The four 75 millimeter screw through holes are positioned in a square pattern such that each through hole is approximately 3.5 inches from the two nearest through holes in the set of four.

The conversion bracket of FIG. 4 may be attached to a CRT monitor caddy by inserting the mounting adaptor 410 prongs into through holes of the upper horizontal plate member of the monitor caddy, and bolting flange 450 to the lower horizontal plate member of the monitor caddy. The legs of the monitor caddy may be adjusted to align the through holes of the flange 450 with through holes of the lower horizontal plate member. When properly secured, the base portion 420 of the conversion bracket may be perpendicular to the upper horizontal plate member and the lower horizontal plate member of the monitor caddy.

Figure 5:
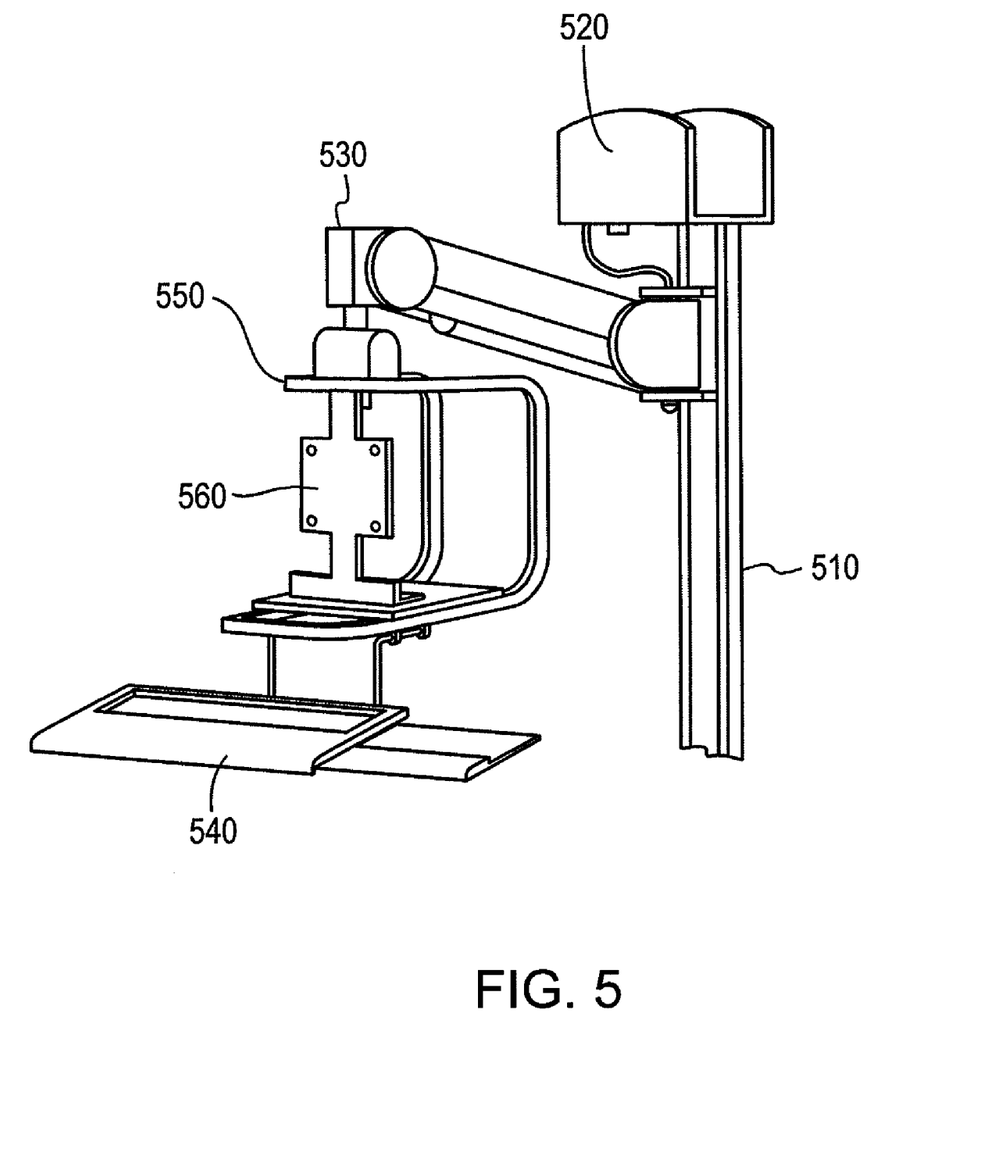
FIG. 5 is a perspective view of a mounting solution having a conversion bracket for use with a flat panel monitor in accordance with an embodiment of the present invention.

FIG. 5 depicts a mounting solution having a conversion bracket for use with a flat panel monitor. The system comprises command post 510, CPU holder 520, suspension arm 530, keyboard holder 540, monitor caddy 550, and conversion bracket 560. The command post 510 is coupled to CPU holder 520 and suspension arm 530. The suspension arm 530 is coupled to monitor caddy 550. The monitor caddy 550 is coupled to keyboard holder 540 and conversion bracket 560.

The conversion bracket 560 is positioned between the front opening of the monitor caddy such that the conversion bracket 560 is parallel to the command post 510. The conversion bracket 560 may be secured to the top surface of the monitor caddy 550 by inserting prongs of the conversion bracket 560 into through holes of the monitor caddy 550. The conversion bracket 560 may be secured to the bottom surface of the monitor caddy 550 by bolting a flange of the conversion bracket 560 to the bottom surface. A flat panel monitor may be attached to the mounting solution by screwing the flat panel monitor to the conversion bracket 560.

Figure 6:
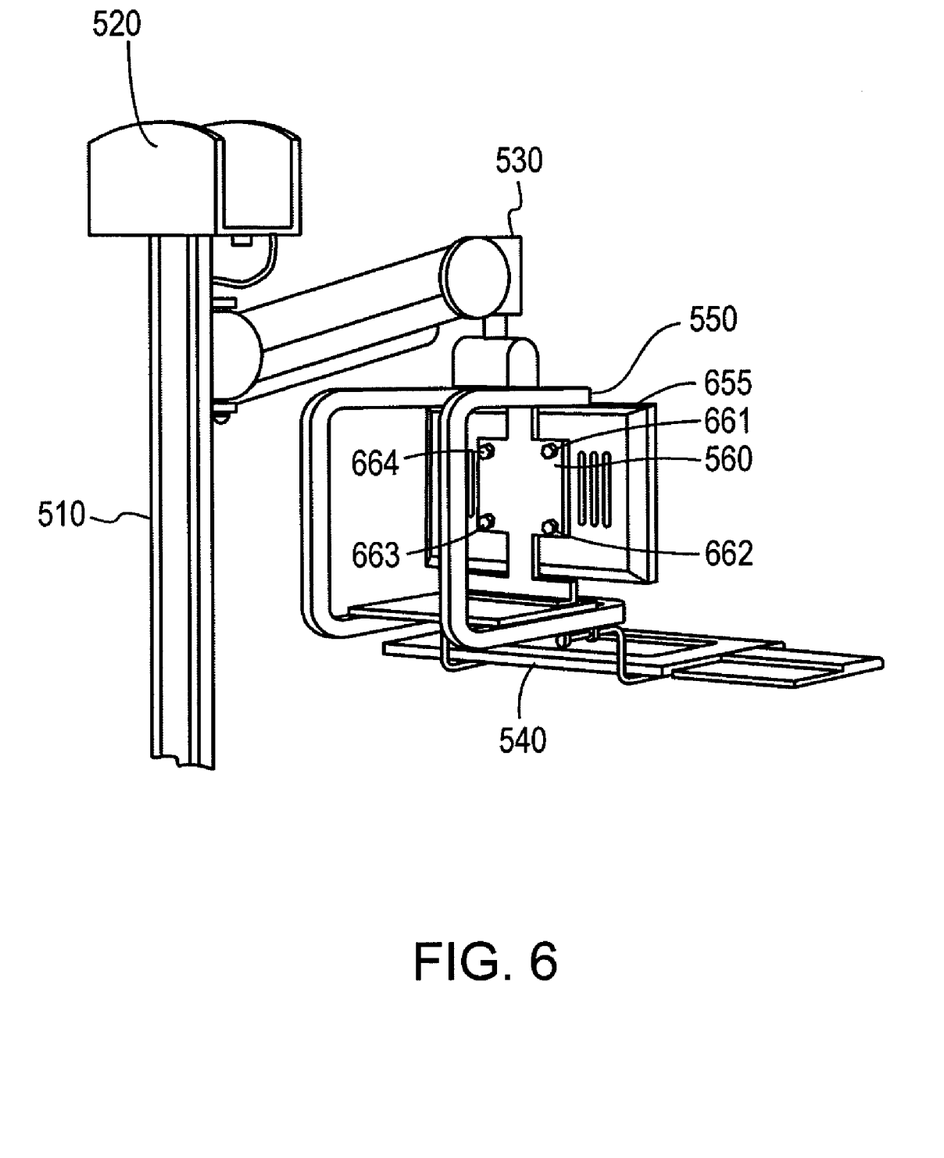
FIG. 6 is a perspective view of a flat panel monitor attached to a conversion bracket of a mounting solution in accordance with an embodiment of the present invention.

FIG. 6 depicts a flat panel monitor attached to a mounting solution having a conversion bracket. The mounting solution of FIG. 6 has the same general physical structure as the embodiment shown in FIG. 5. Thus, the mounting solution of FIG. 6 comprises command post 510, CPU holder 520, suspension arm 530, keyboard holder 540, and monitor caddy 550. FIG. 6, however, further comprises flat panel monitor 655, and screws 661, 662, 663, and 664. In this embodiment of the invention, flat panel monitor 655 may be attached to conversion bracket 560 with screws 661, 662, 663, and 664.

In the forgoing specification, the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A conversion bracket comprising:
a first base portion having a first end and a second end;
a mounting adaptor coupled adjacent the first end of the first base portion, wherein (a) the mounting adaptor comprises a first prong and a second prong and (b) the first prong and the second prong are adapted for engaging a Cathode Ray Tube monitor caddy;
a monitor mounting plate having a first end and a second end, wherein the first end of the monitor mounting plate is coupled to the second end of the first base portion, wherein the monitor mounting plate is configured to secure a flat panel monitor to the conversion bracket;
a second base portion having a first end and a second end, wherein the first end of the second base portion is coupled to the second end of the mounting plate; and
a flange coupled to the second end of the second base portion, wherein the flange is adapted for engaging the Cathode Ray Tube monitor caddy,
wherein the conversion bracket is attached to the Cathode Ray Tube monitor caddy to convert the Cathode Ray Tube monitor caddy to a flat panel monitor caddy by engaging (a) the first prong and the second with the Cathode Ray Tube monitor caddy and (b) the flange with the Cathode Ray Tube monitor caddy.

2. The conversion bracket of claim 1, wherein the monitor mounting plate defines a plurality of holes configured to receive fasteners for securing the flat panel monitor to the conversion bracket.

3. The conversion bracket of claim 1, wherein the flange defines two through holes to enable the conversion bracket to be bolted to the Cathode Ray Tube monitor caddy.

4. The conversion bracket of claim 1, wherein the first prong and the second prong are substantially parallel.

5. The conversion bracket of claim 1, wherein the first prong and the second prong of the mounting adaptor are each one inch in length, wherein the first prong and the second prong fit a first through hole and a second through hole of the Cathode Ray Tube monitor caddy.

6. The conversion bracket of claim 1, wherein each of the first base portion, the monitor mounting plate, the second base portion, and the flange has a thickness of between about 1/32 and about 1/8 inch.

7. The conversion bracket of claim 1, wherein the first base portion, the monitor mounting plate, the second base portion, and the flange comprise a metal alloy.

8. The conversion bracket of claim 1, wherein the first base portion has a length of about between about one and about 16.5 inches.

9. The conversion bracket of claim 1, wherein the monitor mounting plate has a length of between about 4.5 to about 20 inches and a width of least about 4.5 inches.

10. The conversion bracket of claim 1, wherein the second base portion has a length of between about one to about 16.5 inches.

11. A conversion bracket comprising:
- a base portion having a first end, a second end, and a length of between about 12 to about 22 inches;
- a male connector coupled adjacent the first end of the base portion to attach the conversion bracket to an upper horizontal plate member of a Cathode Ray Tube monitor caddy;
- a flange coupled to the second end of the base portion, wherein the flange defines a first plurality of through holes to align with a second plurality of through holes of a lower horizontal plate member of the Cathode Ray Tube monitor caddy; and
- a monitor mounting plate positioned intermediate the first end and the second end of the base portion, wherein the monitor mounting plate is adapted to support a flat panel monitor that is attached to the mounting plate,
- wherein the conversion bracket is attached to the Cathode Ray Tube monitor caddy to convert the Cathode Ray Tube monitor caddy to a flat panel monitor caddy by attaching (a) the male connector coupled adjacent the first end of the base portion to the upper horizontal plate member of the Cathode Ray Tube monitor caddy and (b) the flange coupled to the second end of the base portion to the Cathode Ray Tube monitor caddy.

12. The conversion bracket of claim 11, wherein the monitor mounting plate is welded to the base portion.

13. The conversion bracket of claim 11, wherein the monitor mounting plate and the base portion are integrally formed.

* * * * *